US006631343B1

(12) United States Patent
Kojima

(10) Patent No.: US 6,631,343 B1
(45) Date of Patent: Oct. 7, 2003

(54) METHOD FOR REDUCING THE CALCULATION TIME OF A NUMERICAL CALCULATION FOR A COMPUTER IMPLEMENTED SUPERPOSITION MODEL

(75) Inventor: Eiji Kojima, Kanagawa-ken (JP)

(73) Assignee: Geotop Corporation, Osaka (JP)

(*) Notice: Subject to any disclaimer, the term of this patent is extended or adjusted under 35 U.S.C. 154(b) by 0 days.

(21) Appl. No.: 09/004,578

(22) Filed: Jan. 8, 1998

(30) Foreign Application Priority Data

| Jan. 8, 1997 | (JP) | ............................................. 9-013115 |
| Dec. 3, 1997 | (JP) | ............................................. 9-348528 |

(51) Int. Cl.$^7$ .............................................. G06F 17/50
(52) U.S. Cl. .................................. 703/2; 703/5; 702/17
(58) Field of Search ....................... 395/500.23, 500.26; 702/14, 17; 708/315, 209; 703/2, 5

(56) References Cited

U.S. PATENT DOCUMENTS

| 4,509,150 A | * | 4/1985 | Davis ........................... 367/76 |
| 4,592,032 A | * | 5/1986 | Ruckgaber .................... 367/73 |
| 5,414,674 A | * | 5/1995 | Lichman ....................... 367/49 |
| 5,426,618 A | * | 6/1995 | Chen et al. .................... 367/42 |
| 5,537,344 A | * | 7/1996 | Isshiki et al. ................ 364/725 |
| 5,572,125 A | * | 11/1996 | Dunkel ......................... 324/307 |
| 5,752,167 A | * | 5/1998 | Kitayoshi ................... 455/67.1 |
| 5,812,963 A | * | 9/1998 | Schneider et al. ............ 702/17 |

OTHER PUBLICATIONS

Gerard J. Tango, Numerical Models for VLF Seismic–Acoustic Propagation Prediction: A Review, IEEE, 1988, pp. 198–214.*

Asad Davari, "Seismic Data Processing via Homomorphic Filtering", IEEE, 1993, pp. 483–487.*

Kojima, E., "A Semi–Empirical Method for Synthesizing Intermediate–Period Strong Ground Motions" Doctoral Thesis, Tojoku University, August 1996. (Note: No English version).

Irikura, K., et al., "Simulation of Strong Ground Motion Based on Fractal Composite Faulting Model and Empirical Green's Function" Published Thesis at the Japan Earthquake Study 9th Round, pp. E019–E024, 1994.

Harada, T., et al., "Simulation of Earthquake Ground Motions Using a Seismological Model" Published Thesis at the Japan Earthquake Study 9th Round, pp. E001–E006, 1994.

Irikura, K., "Prediction of Strong Acceleration Motions Using Empirical Green's Function" Published Thesis at the Earthquake Study 7th Round, pp. 151–156, 1986.

Dan, K., et al., "Synthesis of Far–Field Accelerograms from the 1976 Tangshan, China, Earthquake (Ms 7.8) by Semi–Empirical Method" Journal of Structural and Construction Engineering, No. 403, pp. 35–42, Sep. 1989.

Kanamori, H., "A Semi–Empirical Approach to Prediction of Long–Period Ground Motions from Great Earthquakes" Bulletin of the Seismological Society of America, vol. 69, No. 6, pp. 1645–1670, Dec. 1979.

Kanamori, H., et al., "Theoretical Basis of Some Empirical Relations in Seismology" Bulletin of the Seismological Society of America, vol. 65, No. 5, pp. 1073–1095, Oct. 1975.

* cited by examiner

*Primary Examiner*—Samuel Broda
*Assistant Examiner*—T. Pham
(74) *Attorney, Agent, or Firm*—Arent Fox Kintner Plotkin & Kahn

(57) ABSTRACT

A method of reducing the computer calculation time of a superposition is disclosed. A computing device having an input unit, an output unit, a memory unit, and an operation unit, is used to calculate the model superposing the function with shifted value of the variable. The model operator is formed by superposing a delta function in the same manner as the superposition of the function. The convolution of a model operator and the function is determined to thereby reduce the calculation time of the model superposing the function with the shifted value of the variable.

4 Claims, 6 Drawing Sheets

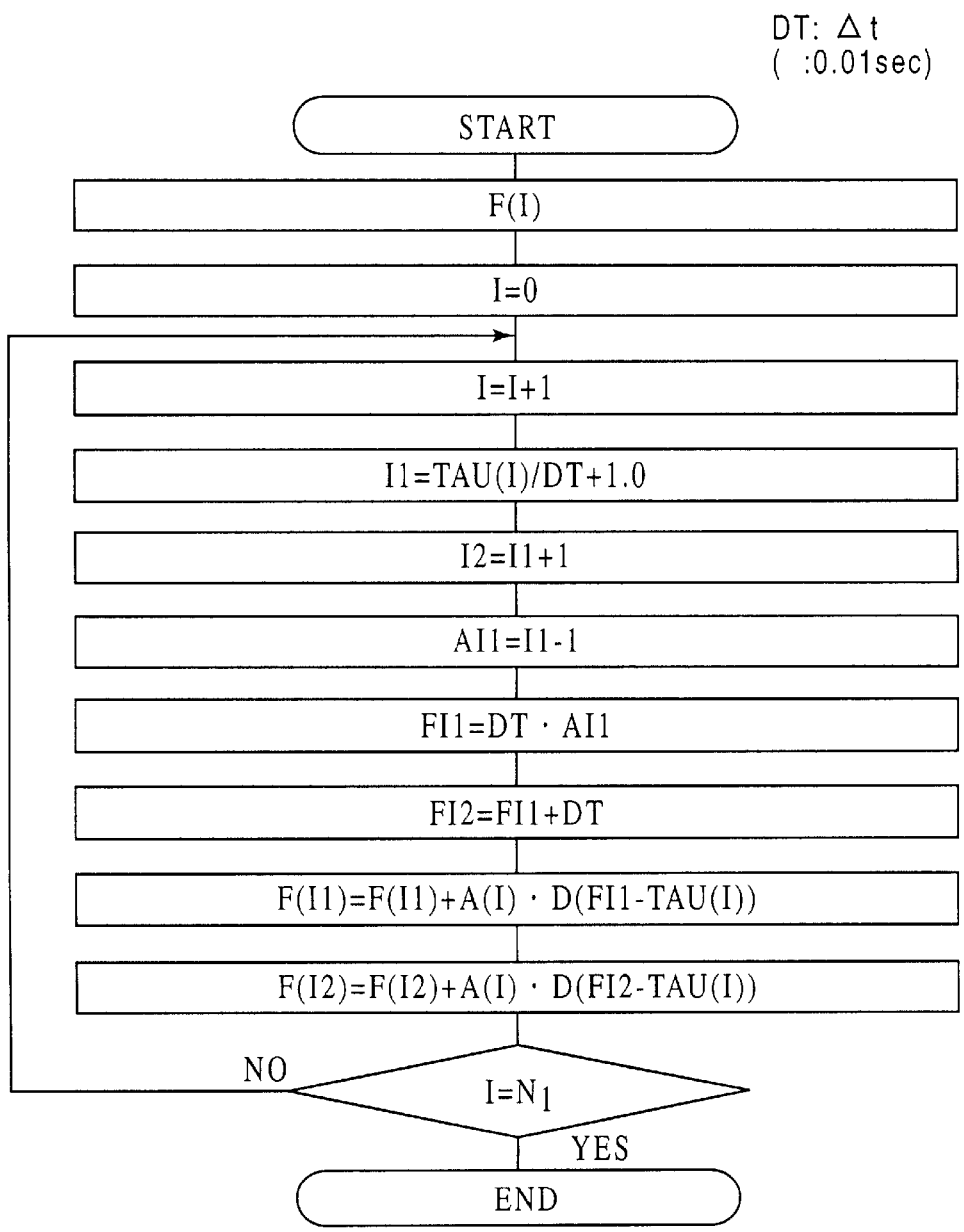

Y(I) : Y(t)
F(I) : F(t)
G(I) : G(t)
DT : Δt
( :0.01sec)

METHOD FOR REDUCING THE CALCULATION TIME OF A NUMERICAL CALCULATION FOR A COMPUTER IMPLEMENTED SUPERPOSITION MODEL

BACKGROUND OF THE INVENTION

1. Technical Field

The invention relates to a method of reducing the calculation time for a numerical calculation for a computer implemented superposition model.

2. Discussion of the Prior Art

It is known to compute a superposition model for a waveform function $G(t-\tau_i)$, as shown in Formula 1. A sampled arrangement $G(I)$ is interpolated by shifting by $\tau_i$ for the respective suffix i to compute an arrangement relative to the function $G(t-\tau_i)$ throughout the domain of the variable t.

$$Y(t) = \sum_{i=1}^{N_i} a_i \cdot G(t - \tau_i) \qquad \text{FORMULA I}$$

where:

Y(t): Superposed waveform where (t) time represents a variable, for example, seismic waves, sound waves, light waves, electromagnetic waves, temperature, voltage, electric current, fluid pressure; additionally, position, displacement, temperature, voltage, electric flow, fluid pressure, or other physical quantities can be substituted for the time.

G(t): Waveform where (t) time represents a variable, for example, seismic waves, sound waves, light waves, electromagnetic waves, temperature, voltage, electric current, fluid pressure; additionally, record of position, displacement, temperature, voltage, electric flow, fluid pressure, or other physical quantities can be substituted for the time.

a: Coefficient i: Suffix $\tau$: Time lag t: Time

Ni: Number of superposition

: Product

The above-described method has some shortcomings. For example:

The function G(t) is a waveform (see FIG. 1) comprising the time t as a variable. The function G(t), however, must first be digitized to be processed by a digital computer. That is, data are processed in the computer in accordance with the arrangement G(I) sampled at $\Delta t$, not the function G(t). Accordingly, the function $G(t-\tau_i)$ must be determined by interpolation, e.g. by shifting the arrangement $G(I)$ by $\tau_i$. This interpolation requires significant processing time because the respective time t, i.e. all arrangements, must be interpolated.

Further, the function $G(t-\tau_i)$ with regard to the respective suffix i, must be multiplied by a coefficient ai. For the purpose of simplifying the discussion herein, the arrangement of the function $G(t-\tau_i)$ comprising $\tau_i$ is interpolated by shifting the arrangement $G(I)$ of the function G(t) for $\tau_i$. All arrangements hereinafter are shown in this manner. The function $G(t-\tau_i)$ is treated as a function in a mathematical formula, while it is also treated as an arrangement in a calculation. To simplify the discussion herein, arrangements are also described as functions in some cases. As discussed above, significant processing time is required to determine the function arrangement for the respective suffix i. Therefore, this type of calculation is not practically implemented in a personal computer.

A superposition model may be used, for example, for the prediction of large seismic waves from data describing small seismic waves. FIG. 2 illustrates a method of predicting an earthquake at the observation points OP. When the waveform G(t) of a small dislocation earthquake SE is observed, displacement occurred on the starting point SP are transferred in different directions with a time lag $\tau$, finally reaching an arrival point AP. This results in a large earthquake LE in which displacement is amplified over a vast range. See Eiji Kojima, *A Semi-Empirical Method for Synthesizing Intermediate-Period Strong Ground Motions*, Doctoral Thesis, Tohoku University (August 1996).

In the foregoing prediction model, the delay is $\tau$lm, which is the traveling time of the seismic waves from the small area (l, m) to the observation point OP, provided that the displacement area is divided in small pieces and that the seismic waves occur at a respective small area (l, m) with a defined delay.

Formula 2, may be used to predict the large seismic wave Y(t), taking into consideration the distance decrement, radioactive characteristics, and slip conditions at the respective area (l, m). A waveform of a small seismic wave G(t) may therefore be processed for superposition to predict a large seismic wave Y(t).

$$Y(t) = \sum_{l=1}^{N_l} \sum_{m=1}^{N_m} \sum_{k=1}^{N_k} (X_{lomo}/X_{lm}) \cdot \qquad \text{FORMULA 2}$$
$$(R_{lm}/R_{lomo}) \cdot G(t - \tau_{lm} - (k-1) \cdot \psi)$$

Where:

Y(t): Large seismic wave representing a ground motion in a large earthquake.

G(t): Small seismic wave representing a ground motion in a small earthquake.

$X_{lm}$: Distance from the observation point to the small area created by dividing the displacement of a large earthquake.

$X_{lomo}$: Distance from the seismic center of the small earthquake.

$R_{lm}$: Radioactive characteristic to the observation point of the small area created by dividing the displacement of a large earthquake.

$R_{lomo}$: Radioactive characteristic to the observation point of a small earthquake.

$\tau$: Time lag t: Time l, m, k: Suffix

Nl, Nm, Nk: Number of superposition $\psi$: Time lag of slippage in a small earthquake.

SUMMARY OF THE INVENTION

This invention resolves the above disadvantages of the prior art techniques by providing a method for reducing the calculation time for the numerical calculation of a computer implemented superposition model.

In a first embodiment of the invention, a method is provided for reducing the calculation time of a numerical calculation for a computer implemented superposition model. This method includes a step for calculating a model of superposing the function with shifted values for a variable using a computer equipped with an input unit, an output unit, and a memory unit. A model operator is formed by superposing the delta function in the same manner as the superposed function model to determine the composition product of the model operator and the function.

In a second embodiment of the invention, a method is provided for reducing the calculation time of a numerical calculation for a computer implemented superposition model, in which the model is computed plural times.

In a third embodiment of this invention, a method is provided for reducing the calculation time for a numerical calculation for a computer implemented superposition function model, in which a variable of the function is time, location, temperature, or other physical quantities.

In a fourth embodiment of this invention, a medium is provided for use by computer and on which a program is stored for reducing the calculation time of a computer for the numerical calculation of a superposition model. Using the program stored on the medium, a model of superposing the function having shifted values for a variable is calculated by a computer equipped with an input unit, an output unit, and a memory unit. A model operator is formed by superposing a delta function in the same manner as the superposed function model to determine the composition product of the model operator and the function.

In a fifth embodiment of the invention, a medium is provided for use by a computer and having therein a program for reducing the calculation time of a numerical calculation of a superposition, the model is computed plural times.

In a sixth embodiment of the invention, a medium is provided for storing a program for reducing the calculation time of a numerical calculation of a superposition model, a variable of the function is time, location, temperature, or other physical quantities.

BRIEF DESCRIPTION OF THE DRAWINGS

FIG. 5 is a flowchart of the computer processing for Formula 4;

DETAILED DESCRIPTION OF THE PREFERRED EMBODIMENT

In forming various models such as a prediction model or a control model, functions relating to such factors as prediction or control are determined by superposing the functions necessary for such prediction or control based upon the production models.

For example, provided that the model simply has only one $\Sigma$ for the summation of the waveform in a small earthquake, the waveform may be represented as the function G(t), and waveforms of a large earthquake may be predicted by superposing the waveforms and by the function Y(t) of Formula 3 herein. Here, the reference signs t and τ are used in an example of the waveform in an earthquake, thereby representing time and the time lag, respectively. In other examples, the function G(t) may be other physical quantities such as sound-waves, light waves, electromagnetic waves, temperature, voltage, electric current, or fluid pressure. The variable t may also be other physical quantities, such as positions, displacement, temperature, electric current, voltage, or fluid pressure.

$$Y(t) = \sum_{i=1}^{N_i} a_i \cdot G(t - \tau_i) \qquad \text{FORMULA 3}$$

where:

Y(t): Superposed wave where (t) time represents a variable, for example, seismic waves, sound waves, light waves, or electromagnetic waves.

G(t): Waveform where (t) time represents a variable, for example, seismic waves, sound waves, light waves, or electromagnetic waves.

In Formula 3, the model of superposing the function G(t) may be replaced by Formula 4 and Formula 5, where Formula 4 is composed of the convolution of the model operator F(t) and the function G(t). and where Formula 5 is composite integration of the Dirac's delta function. After the replacement, the variable $(t-\tau_i)$ shifts from the function G $(t-\tau_i)$ to the Dirac's delta function $\delta$ $(t-\tau_i)$. Then, the superposing operation of the function $G(t-\tau_i)$ shifts to the model operator F(t). The model operator F(t) is the superposition of the delta function $\delta$ $(t-\tau_i)$.

$$Y(t)=F(t)*G(t) \qquad \text{FORMULA 4}$$

where:

F(t): Model operator of superposed dislocation

*: Convolution $$F(t) = \sum_{i=1}^{N_i} a_i \cdot \delta(t - \tau_i) \qquad \text{FORMULA 5}$$

where:

δ(t): Dirac's delta function

The delta function $\delta$ $(t-\tau_i)$ becomes zero at points other than the point where the variable t is in the neighborhood of $\tau_i$ and becomes zero at most domains of the variable t, thereby enabling straightforward calculation of the delta function of the respective suffix.

In computing the arrangement of the model operator F(t) in which the delta function $\delta$ $(t-\tau_i)$ is superposed, $\tau_i$ is included in a group within the same sampling time Δt, and the wave of the model operator F(t) becomes zero at most domains. Thus, this process makes it possible to increase the processing speed for the convolution of the model operator F(t) and the function G(t).

Figure 2:
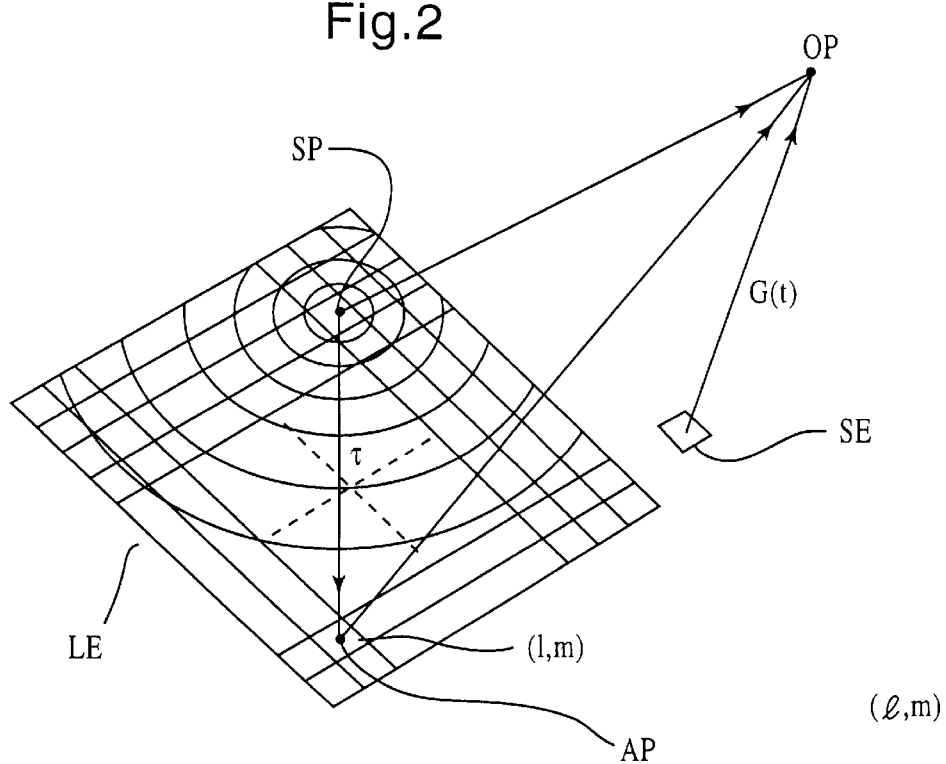
FIG. 2 illustrates a model of predicting a waveform of a large earthquake resulting from a small earthquake.

When the function G(t) is a physical phenomenon, $\tau_i$ included in a group within the same sampling time Δt at many suffixes because of, e.g. the relativity. For example, if an earthquake has a far field observation point, as shown in FIG. 2, the time lag $\tau_i$ of superposition in the transmitting period of the displacement and that of the seismic wave has almost the same value at the concentric circle of the starting point SP, and is therefore in the group within the sampling time $\Delta t$. Accordingly, the arrangement of the model operator F(t) becomes smaller in comparison to the number of the suffix i, thereby reducing the calculation time of the convolution of Formula 4.

Figure 4:
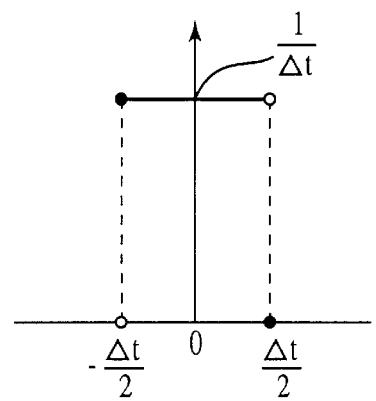
FIG. 4 is another approximate curved line of the delta function.
Figure 3:
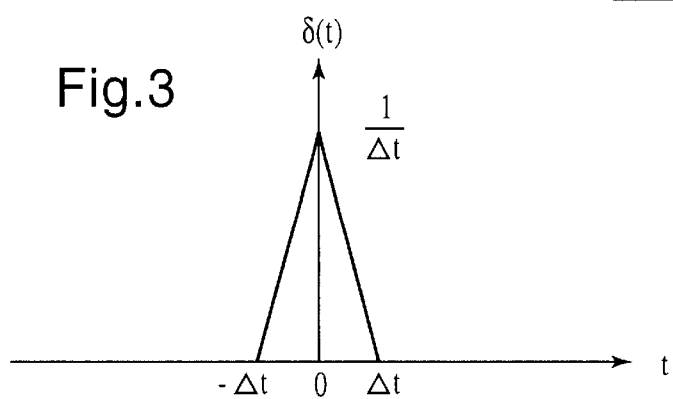
FIG. 3 is an approximate curved line of the delta function.

The delta function $\delta(t)$ is defined in Formula 6 below. The delta function may be generalized as in Formula 7 below. The function $d\Delta t(t)$ of Formula 7 has numerous functions. The example of the delta function is shown in FIG. 3, where the value of $\Delta t$ in the delta function is very small. It is $1/\Delta t$ when the variable t is zero, and the value of $\Delta t$ is zero when the variable t is $-\Delta t$ or smaller, or when the variable t is $+\Delta t$ or larger. Thus, it is possible to express a straight line between $-\Delta t$ and $\Delta t$ as an approximate formula. This approximate formula is explained in Formula 8 below. At this point, the delta function $\delta(t-\tau_i)$ may be determined by a straight line interpolation of the suffix i. For example, as shown in FIG. 4, the value of $\Delta t$ in other examples of the delta function is very small, and when the variable t is between $-\Delta t/2$ and $\Delta t/2$, the value is $1/\Delta t$. When variable t is $-\Delta t/2$ or smaller, or when the variable t is $\Delta t/2$ or larger, the value becomes zero. Formula 9 below provides an approximate formula of this example.

In FIG. 4, the delta function $\delta(t)$ is equal to $1/\Delta t$ when t is equal to $-\Delta t/2$ where the formula $\delta(t)=1/\Delta t$ is represented by a black dot. The delta function $\delta(t)$ is equal to zero when t is equal to $\Delta t/2$, where the formula $\delta(t)=0$ is represented by a black dot. Alternatively, by switching the black and white dots, the delta function $\delta(t)$ is equal to zero when t is equal to $-\Delta t/2$, and the delta function b(t) is equal to $1/\Delta t$ when t is equal to $\Delta t/2$.

$$f(t)=f(t)*\delta(t) \qquad \text{FORMULA 6}$$

f(t): Continuously differentiable function and
$\lim f(t)=0$, $\lim f(t)=0$ simultaneously $t\to\infty$ $t\to\infty\to\infty$
$\delta(t)$: Dirac's delta function $$\delta(t) = \lim_{\Delta t \to 0} d_{\Delta t}(t) \qquad \text{FORMULA 7}$$

where:
$d_{\Delta t}(t)$: Modeled and discreted delta function
$\Delta t$: Infinitesimal value ($\Delta t$ may be other than a sampling time)

When $|t| \geq \Delta t$, $d_{\Delta t}(t)=0$
When $|t| < \Delta t$, $d_{\Delta t}(t)=1/\Delta t-|t|/(\Delta t)^2$ \qquad FORMULA 8 where:
$d_{\Delta t}(t)$: Modeled and discreted delta function
t: Time
$\Delta t$: Sampling time When $t<-\Delta t/2$, $\Delta t/2 \leq t$, $d_{\Delta t}(t)=0$
When $-\Delta t/2 \leq t < \Delta t/2$, $d_{\Delta t}(t)=1$ \qquad FORMULA 9

The model operator F(t) is shown in Formula 5, where the arrangement of the delta function is multiplied by the arrangement of the coefficient a. Computing the superposition of the model operator F(t), for example, may be done by the use of a computer following the process of FIG. 5. The flowchart shown in FIG. 5 is an example of the simple explanation of the process, and it is not designed to provide a calculation for programming or increasing the computing speed.

Figure 6:
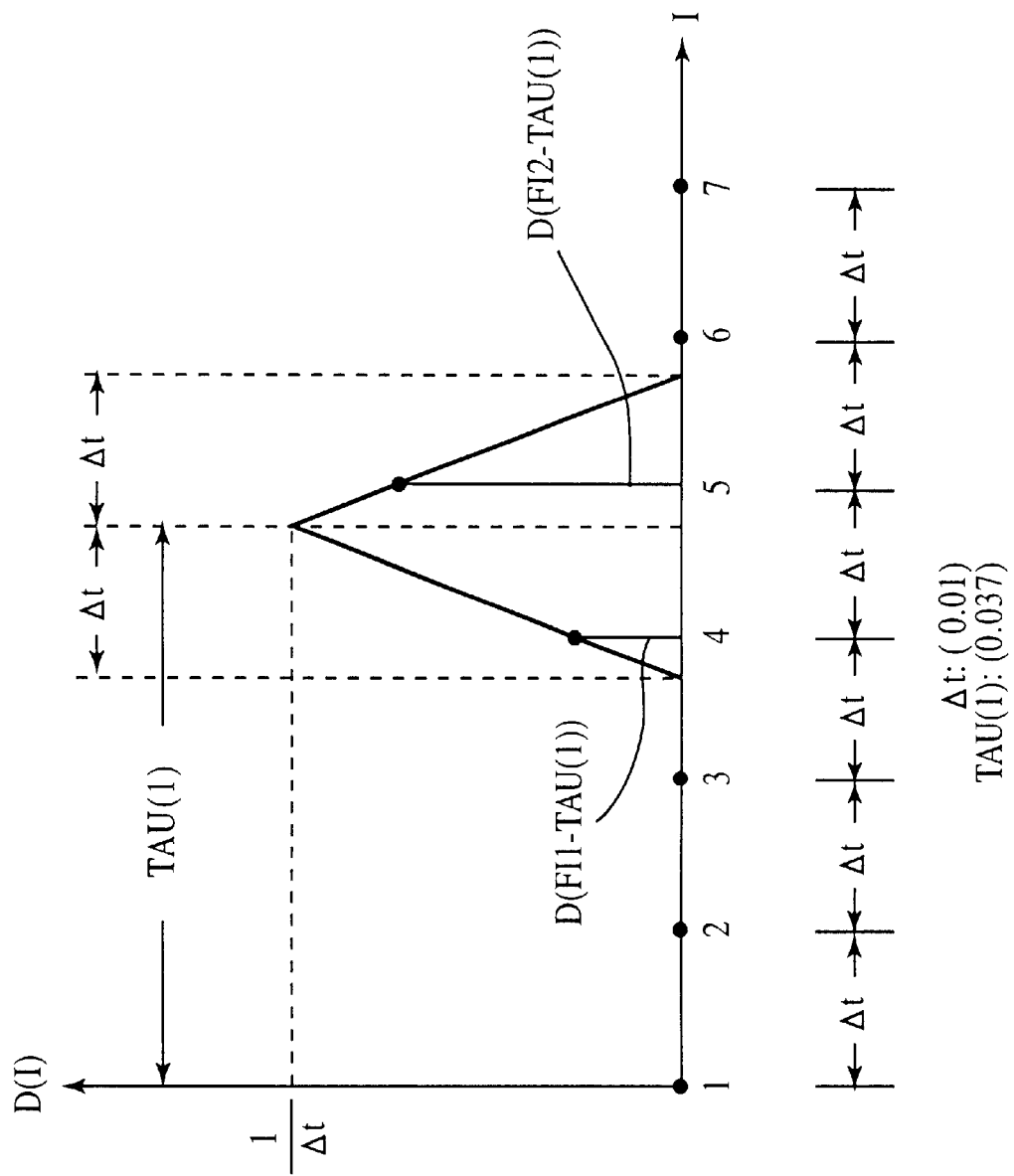
FIG. 6 illustrates a calculation of the interpolation of the delta function.

In calculating the model operator of FIG. 5, the function in FIG. 3 may be applied as in FIG. 6. The delta function is shifted for the time lag $\tau_i$, the arrangement TAU(3), to determine the digitized value of the delta function at every time. In FIG. 6, when $\Delta t$ is 0.01 second and the time lag $\tau 3$ is 0.0375 second, the model operator F(t) determines the values of the arrangement F(4) and the arrangement F(5). The other arrangement F(I) becomes zero. When the time lag $\tau 8$ is 0.0310, the function F(t) determines the values of the arrangement F(4) and the arrangement F(5) as when the time lag $\tau 3$ is 0.0375. The other arrangement F(I) becomes zero. Even when the respective time lag is $\tau 3$ and $\tau 8$, each may be superposed at the common location I of the arrangement F(I). The arrangement F(I) is determined by repeating the computation of all suffixes. A flowchart of FIG. 7 shows the process of computing the arrangement of the convolution Y(t) of the arrangement of the function G(t) by use of the model operator F(t).

Figure 7:
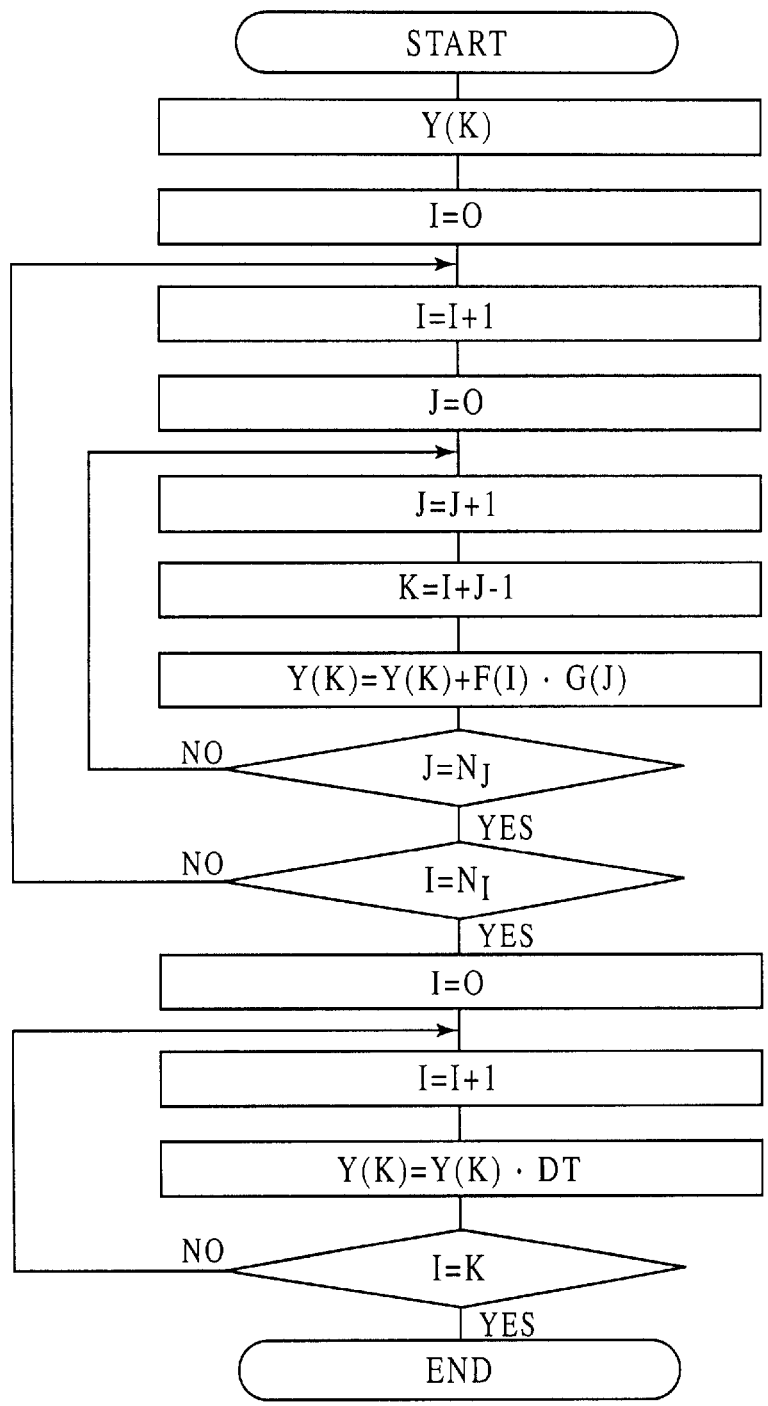
FIG. 7 is a flowchart of the computer processing for Formula 3.

FIG. 7 is a flow diagram that illustrates a process for calculating the value of the convolution Y(t) at every sampling time $\Delta t$. The model operator F(t) and the function G(t) are shifted every $\Delta t$ to multiply one another to determine the total convolution Y(t) in addition to the convolution Y(t) at the certain sampling time $\Delta t$. Accordingly, the arrangement of the convolution Y(t) is determined.

The calculation time may be reduced in the same way where a plural number of summations exist, as shown in Formula 2, i.e. a plural number of summation signs $\Sigma$ exist. For example, the superposition formula of Formula 2 may be adapted as shown by the following Formulae 10–12. Formulae 10–12 increase the computing speed just as Formulae 4 and 5.

$$Y(t)=E(t)*F(t)*G(t) \qquad \text{FORMULA 10}$$

where:
Y(t): Superposed waveform where (t) time represents a variable
E(t): Model operator for superposed dislocation
F(t): Model operator for superposed slippage
G(t): Waveform where (t) time represents a variable $$E(t) = \sum_{l=1}^{N_1} \sum_{m=1}^{N_m} (X_{lomo}/X_{lm}) \cdot (R_{lm}/R_{lomo}) \cdot \delta(t-\tau_{lm}) \qquad \text{FORMULA 11}$$

where:
E(t): Model operator for superposed dislocation
$\delta(t)$: Dirac's delta function $$F(t) = \sum_{k=1}^{N_k} \delta(t-(k-1)\cdot\psi) \qquad \text{FORMULA 12}$$

where:
F(t): Model operator for superposed slippage
$\delta(t)$: Dirac's delta fiction The same process may be used to reduce the calculation time in determining the summation of the function with the plural number of differential as in Formula 13. For instance, in this particular situation, Formula 13 may be substituted for Formula 3. Formula 14 increases the calculation speed in the same process explained in Formula 4.

$$Y(t) = \sum_{i=1}^{N_1} a_{i1} \cdot G_1(t-\tau_i) + \sum_{i=1}^{N_2} a_{i2} \cdot \dot{G}_2(t-\tau_i) + \sum_{i=1}^{N_3} a_{i3} \cdot \ddot{G}_3(t-\tau_i) + \ldots \quad \text{FORMULA 13}$$

where:
- Y(t): Superposed waveform where (t) time represents a variable, for example, seismic waves, sound waves, light waves, electromagnetic waves, voltage for control, or electric current for control.
- $G_1(t)$, $G_2(t)$, $G_3(t)$ . . . : Waveform, for example, seismic waves, sound waves, light waves, electromagnetic waves, electric current, or voltage.
- $a_{ij}$: Coefficient
- $N_1$, $N_2$, $N_3$ . . . : Numbers
- : First differential of t
- : Second differential of t $$Y(t)=F_1(t)*G_1(t)+F_2(t)*\dot{G}_2(t)+F_3(t)*\ddot{G}_3(t)+ \quad \text{FORMULA 14}$$

where:
- Y(t): Superposed waveform where (t) time represents a variable, for example, seismic waves, sound waves, light waves, electromagnetic waves, voltage for control, or electric current for control.
- $G_1(t)$, $G_2(t)$, $G_3(t)$ . . . : Waveform, for example, seismic waves, sound waves, light waves, electromagnetic waves, electric current, or voltage.
- $F_1$, $F_2$ . . . : Model operator
- : First differential of t
- : Second differential of t Provided that $G_1(t)$, $G_2(t)$, $G_3(t)$ . . . are same in both Formula 13 and Formula 14, Formula 16 is determined by applying Formula 15, which is the differential with the delta function, and by defining the new model operator of Formula 17. Function 16 simplifies the calculation enabling a further reduction of the calculation time of the computer. In Formulae 13–17, the differential may be replaced with an integration.

$$\dot{f}(t)=\delta(t)*\dot{f}(t)=\dot{\delta}(t)*f(t) \quad \text{FORMULA 15}$$

where:
- : First differential of t
- f(t): Continuously differentiable function and $\lim f(t)=0$, $\lim f(t)=0$ simultaneously $t\to\infty$ $t\to-\infty$ $$Y(t)=F_1(t)*G(t)+F_2(t)*\dot{G}(t)+F_3(t)*\ddot{G}(t)+\ldots = \{F_1(t)+\dot{F}_2(t)+\ddot{F}_3(t)+\ldots\}*G(t)=F(t)*G(t) \quad \text{FORMULA 16}$$

where:
- Y(t):. Superposed waveform where (t) time represents a variable, for example, seismic waves, sound waves, light waves, electromagnetic waves, voltage for control, or electric current for control.
- G(t): Waveform, for example, seismic waves, sound waves, light waves, or electromagnetic waves.
- $F_1(t)$, $F_2(t)$ . . . : Model operator
- : First differential of t
- : Second differential of t $$F(t)=F_1(t)+F_2(t)+F_3(t)+ \quad \text{FORMULA 17}$$

where:
- F(t): New model operator
- $F_1(t)$, $F_2(t)$ . . . : Model operator

Calculation of the superposition model, e.g. the calculation of the superposition model shown in the flow charts of FIG. 5 and FIG. 7, is processed with a program saved in a computer language. This program may be saved on a medium such as a floppy disk, a hard disk, or a memory, and a computer reads the program on the medium to superpose when the calculation is necessary.

The following is an example of one application of this invention when predicting a large earthquake from a small earthquake.

The relation of Formula 3 is determined through a simplified model for predicting the waveform of a large earthquake from the waveform of a small earthquake. The coefficient a of Formula 3 is the correction coefficient for creating an assumption that the displacement started at the starting point to extend to the certain point, the suffix i, where the small earthquake occurred. The time lag $\tau_i$ relates to the period until the small earthquake occurs at the destination point, the suffix i, and is observed from the beginning of the displacement. The function $G(t-\tau_i)$ is the waveform of the small earthquake predicted at the observation point, the suffix i. The function Y(t) is a waveform of the predictable large earthquake.

Figure 8:
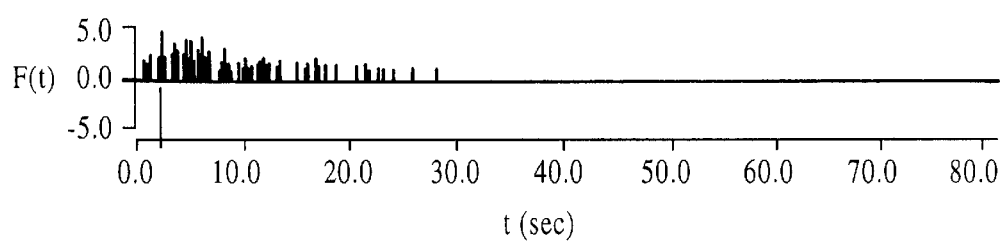
FIG. 8 illustrates an arrangement of the model operator F(I) for predicting a small earthquake.

Formula 3 is modified to form Formula 4 and Formula 5, and the model operator F(t) is determined by the calculation of Formula 5 following the flowchart of FIG. 5. This arrangement is shown in FIG. 8. The arrangement in FIG. 8 is focused on a certain time, which decreases the number of the value for an arrangement that is not zero. The model operator F(t) is simplified and Formula 4 is simplified as well to reduce the calculation time of the waveform Y(t) of a large earthquake that is predictable by the numerical calculation.

Figure 1:
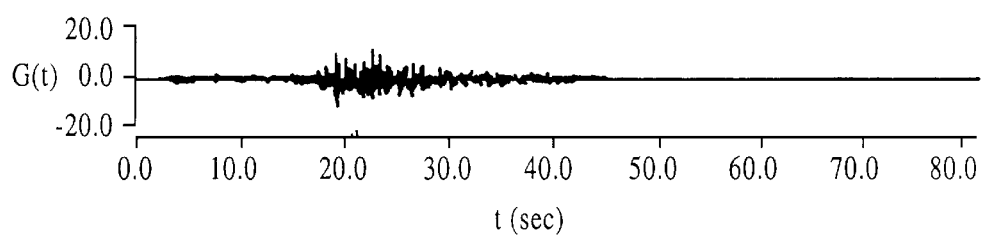
FIG. 1 illustrates an arrangement of the function G(I) relating to a small earthquake.
Figure 9:
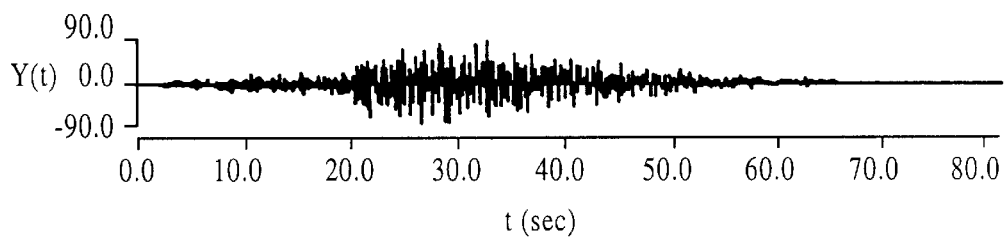
FIG. 9 illustrates an arrangement of the function Y(I) relating to a large earthquake.

FIG. 1 (discussed above) illustrates an arrangement of the function G(t) with respect to a small earthquake. At this point, the arrangement of the model operator F(t) determined above and the convolution of the arrangement of the function G(t) are computed in accordance with the process shown in of FIG. 7. FIG. 9 shows the result of the calculation. During the calculation, the calculation time of the convolution for the arrangement of the model operator F(t) is dramatically reduced because the number of the arrangement is very small.

In Formula 4, the model operator F(t) is predetermined by the prediction model, and the function G(t) is the seismic waves in a small area, which is subject to the real time observation. Formula 4 is the composite integration of F(t) and G(t). Therefore, the observed portion of G(t) is composited in F(t) whenever G(t) is observed, and the result of this operation is added to the previously determined result which was determined through the above-described same operation, thereby making the real time calculation of the function Y(t) possible. Accordingly, the real time calculation becomes possible by high speed numerical processing by personal computers.

The operation, i.e. real time calculation is not possible when the variable in the operation is the frequency w; for observing the waveform of the whole area, however, if the variable is time t, a real time calculation is possible. Using the waveform during the observation (if the waveform not observed is assumed to be zero), G(t) requires a frequency analysis every time, which slows down the computation on a computer.

The invention is not limited to the embodiments described above. For example, real time control is applicable to a vibration control method for architecture, a real time positioning control mechanism with GPS, a factory control system, a control mechanism for spraying concrete on a rough surface, a robot control mechanism, or a quality control mechanism for merchandise. If the above-explained superposition control model is applicable, real time control is possible in that mechanism.

The invention provides at least one of the following advantages. For example, the model operator reduces the computer calculation time for a superposed function model. When the function indicates physical phenomena, the relativity reduces computer calculation time for the superposed function model. The model operator is used to replace Formula 3 with the Formula 4 and Formula 5, which minimizes the chances of a calculation differences. A personal computer implementing the invention may be used for heavy computation. Thus, the invention provides easy access by use of a computer to high-level computing mechanisms for a considerably lower cost. This invention also eliminates the situation that a computer operator is required to occupy the computer for quite a long period of time due to the significant processing time required.

It is readily apparent that the above-described has the advantage of wide commercial utility. It should be understood that the specific form of the invention hereinabove described is intended to be representative only, as certain modifications within the scope of these teachings will be apparent to those skilled in the art. Accordingly, reference should be made to the following claims in determining the full scope of the invention.

What is claimed is:

1. A method of predicting movement of matter or energy by calculating a discrete superposition model using a computer terminal, the method comprising the steps of:

replacing a first superposition model represented by the following formula:

$$Y(t) = \sum_{i=1}^{N_i} a_i^* G(t - \tau_i)$$

with a second superposition model represented by the following formula:

$$Y(t) = \left\{ \sum_{i=1}^{N_i} a_i^* \delta(t - \tau_i) \right\} * G(t); \text{ and}$$

calculating on the computer terminal a discrete version of the second superposition model interpolating only a delta function, wherein Y(t) is a superposed wave;
t represents time;
$N_i$ is a selected number of superpositions;
$a_i$ is a coefficient;
i is a suffix;
$\tau$ is time lag;
$\delta(t-\tau_i)$ is the delta function;
* is convolution;
G(t) is a sampled waveform without the variable time lag; and
wherein the delta function $\delta(t-\tau_i)$ is zero other than at points where the variable t is within a selected range of $\tau$ thereby reducing the computer processing time.

2. The method of claim 1, wherein said model is computed plural times.

3. A medium for storing a program of predicting movement of matter or energy by calculating a discrete superposition model using a computer terminal, the method comprising the steps of:

replacing a first superposition model represented by the following formula:

$$Y(t) = \sum_{i=1}^{N_i} a_i^* G(t - \tau_i)$$

with a second superposition model represented by the following formula:

$$Y(t) = \left\{ \sum_{i=1}^{N_i} a_i^* \delta(t - \tau_i) \right\} * G(t); \text{ and}$$

calculating on the computer terminal a discrete version of the second superposition model interpolating only a delta function, wherein Y(t) is a superposed wave;
t represents time;
$N_i$ is a selected number of superpositions;
$a_i$ is a coefficient;
i is a suffix;
$\tau$ is time lag;
$\delta(t-\tau_i)$ is the delta function;
* is convolution;
G(t) is a sampled waveform without the variable time lag; and
wherein the delta function $\delta(t-\tau_i)$ is zero other than at points where the variable t is within a selected range of $\tau$ thereby reducing the computer processing time.

4. The medium of claim 3, wherein said model is computed plural times.

* * * * *